United States Patent
Jeon et al.

(10) Patent No.: US 9,970,543 B2
(45) Date of Patent: May 15, 2018

(54) SHIFT BY WIRE TRANSMISSION SHIFT CONTROL SYSTEM WITH PARK RELEASE

(71) Applicant: Dura Operating, LLC, Auburn Hills, MI (US)

(72) Inventors: Jinseok Jeon, LaSalle (CA); Brian D. Howe, Shelby Township, MI (US)

(73) Assignee: Dura Operating, LLC, Auburn Hills, MI (US)

( * ) Notice: Subject to any disclaimer, the term of this patent is extended or adjusted under 35 U.S.C. 154(b) by 388 days.

(21) Appl. No.: 14/972,918

(22) Filed: Dec. 17, 2015

(65) Prior Publication Data
US 2017/0175888 A1   Jun. 22, 2017

(51) Int. Cl.
| F16H 19/02 | (2006.01) |
|---|---|
| F16H 63/34 | (2006.01) |
| F16H 61/28 | (2006.01) |
| F16H 61/32 | (2006.01) |
| F16H 63/28 | (2006.01) |
| F16H 59/08 | (2006.01) |

(52) U.S. Cl.
CPC ......... *F16H 63/3466* (2013.01); *F16H 19/02* (2013.01); *F16H 61/28* (2013.01); *F16H 61/32* (2013.01); *F16H 63/28* (2013.01); *F16H 2059/081* (2013.01); *F16H 2061/2892* (2013.01)

(58) Field of Classification Search
CPC ...... F16H 63/3466; F16H 19/02; F16H 61/28; F16H 61/32; F16H 63/28
See application file for complete search history.

(56) References Cited

U.S. PATENT DOCUMENTS

| 4,745,822 A * | 5/1988 | Trachman ............. | F16H 63/304 74/335 |
|---|---|---|---|
| 5,180,959 A * | 1/1993 | Christopher .......... | F16H 63/304 318/266 |
| 6,484,598 B2 | 11/2002 | Peter | |

(Continued)

FOREIGN PATENT DOCUMENTS

| JP | 2008-180250 | 8/2008 |
|---|---|---|
| JP | 2010-151302 | 7/2010 |

OTHER PUBLICATIONS

Photo of what is understood to be a Siemens' Actuator for a Mercedes Vehicle.

(Continued)

*Primary Examiner* — David M Fenstermacher
(74) *Attorney, Agent, or Firm* — Reising Ethington P.C.; Matthew J. Schmidt; Robert E. Ford

(57) ABSTRACT

At least some implementations of a gear shift control system include first and second drive members, a drivetrain selectively driven by the first and second drive members and a retainer. The drivetrain includes a first input driven by the first drive member, a second input and an output coupled to and selectively driven by both the first input and the second input. The second drive member is coupled to the second input to drive the output through the second input during a second mode of operation to cause a transmission gear shift. The retainer is selectively coupled to the second input and movable between first and second positions to permit movement of the second input during the second mode of operation and prevent such movement during a first mode of operation.

24 Claims, 5 Drawing Sheets

(56) References Cited

U.S. PATENT DOCUMENTS

| | | | |
|---|---|---|---|
| 6,918,314 B2 | 7/2005 | Wang | |
| 7,241,244 B2* | 7/2007 | Wang | F16H 61/32 188/1.12 |
| 7,354,372 B2 | 4/2008 | Wang | |
| 8,037,972 B2* | 10/2011 | Fujita | B60T 1/005 188/156 |
| 8,336,418 B2 | 12/2012 | Giefer et al. | |
| 8,413,784 B2 | 4/2013 | Giefer et al. | |
| 8,499,661 B2* | 8/2013 | Rake | F16H 61/22 74/473.25 |
| 8,560,193 B2 | 10/2013 | Krishnaswami et al. | |
| 8,936,524 B2 | 1/2015 | Howe et al. | |
| 9,470,277 B2* | 10/2016 | Dow | G05G 1/04 |
| 2002/0045506 A1* | 4/2002 | Scheuerer | F16H 61/12 475/5 |
| 2002/0134185 A1* | 9/2002 | Tsuzuki | F16H 61/32 74/473.1 |
| 2003/0221499 A1* | 12/2003 | Wong | F16H 59/08 74/335 |
| 2009/0326767 A1 | 12/2009 | Kamada et al. | |
| 2010/0024584 A1* | 2/2010 | Giefer | F16H 59/0204 74/473.18 |
| 2011/0138532 A1 | 6/2011 | Lin | |

OTHER PUBLICATIONS

Written Opinion & International Search Report for PCT/US13/41179 dated Aug. 26, 2013, 11 pages.

EP Extended Search Report for EP Application No. 16202914.4 dated Mar. 27, 2017 (11 pages).

\* cited by examiner

SHIFT BY WIRE TRANSMISSION SHIFT CONTROL SYSTEM WITH PARK RELEASE

TECHNICAL FIELD

The present disclosure relates generally to a gear shift system for a vehicle transmission.

BACKGROUND

In some vehicles, a gear shift lever in a passenger compartment of the vehicle can be moved by an operator of the vehicle to shift the vehicle transmission between its park gear and other gears, such as reverse, neutral and forward drive gears. The shift lever is mechanically coupled to the transmission through a cable that transmits the shift level movement to a transmission shift mechanism. Other vehicles use a so-called "shift-by-wire" system wherein an operator shift lever or shift control unit is not physically coupled to the transmission shift mechanism by a cable. Instead, the shift control unit is electrically coupled to a shift actuator that is arranged to shift the transmission upon receipt of a signal from the shift control unit that a transmission gear shift is desired by the operator. If electrical power is lost to the vehicle, or to the electrical circuit of the vehicle from which electricity is supplied to the shift-by-wire system, then the ability of the operator to control shifting of the transmission via the shift control unit is also lost.

SUMMARY

At least some implementations of a gear shift control system include first and second drive members, a drivetrain selectively driven by the first and second drive members and a retainer. The drivetrain includes a first input driven by the first drive member during a first mode of operation to cause a transmission gear shift, a second input driven during a second mode of operation to cause a transmission gear shift and an output coupled to and selectively driven by both the first input and the second input, the output adapted to be coupled to a shift mechanism of the transmission. The second drive member is coupled to the second input to drive the output through the second input during the second mode of operation to cause a transmission gear shift. And the retainer is selectively coupled to the second input and movable between a first position wherein the retainer prevents movement of the second input during the first mode of operation and a second position wherein the retainer permits movement of the second input during the second mode of operation. The second drive member may drive the second input during the second mode of operation even if electrical power is lost to the system, and even if the first drive member is not functioning. The second drive member may be manually driven, or it may include a spring or other stored energy source capable of driving the second input.

In at least one implementation, the second drive element includes a drive gear coupled to the second input and the retainer includes at least one stop surface engaged by a stop in the first position to prevent rotation of the drive gear, wherein the retainer stop surface may be disengaged from the stop in the second position to permit rotation of the drive gear. The drive gear may be manually rotated, if desired, and may be rotated in a first direction to cause a transmission gear change toward or into a park gear and in a second direction to cause a transmission gear change away from or out of park gear. The drive gear and second input may include meshed teeth so that rotation of the drive gear rotates the second input. The first input, second input and the output may be gears in a planetary gear set with the first input being one of a sun gear and a ring gear and the second input being the other of the sun gear and ring gear, and the second input includes teeth that are meshed with teeth of the drive gear.

The drivetrain may be received within a housing and the stop engageable by the stop surface may be defined by the housing. The system may also include a limit surface adapted to limit movement of the second input during the second mode of operation. The limit surface may be positioned so that when the limit surface is engaged by the second input the transmission is in a desired gear, which may be park or some other gear.

At least some implementations of a gear shift control system include a first drive member including an electric motor, an output adapted to be coupled to a vehicle transmission and to the first drive member to be driven for rotation by the first drive member, a planetary gear set and a second drive member. The planetary gear set is coupled to the first drive member and the output, and has three intermeshed gear elements including a ring gear, a sun gear and at least one planet gear. A first gear element is coupled to the first drive member and is driven for rotation by the first drive member, and a second gear element is coupled to the output shaft for rotation with the output shaft. The second drive member is coupled to a third gear element to drive the output shaft through the third gear element. In a first mode of operation, the transmission is shifted between park and other gears by causing the first drive member to rotate the output through the second gear element and the first gear element when a transmission gear shift is desired. During a second mode of operation, the transmission is shifted by the second drive member which drives the output through the third gear element and first gear element. The second drive member includes a drive gear with teeth and the third gear element includes teeth meshed with the drive gear teeth so that rotation of the drive gear causes rotation of the third gear element.

In at least some implementations, at least one stop surface with which the retainer is selectively engaged to prevent rotation of the drive gear, and wherein the drive gear teeth are engaged with teeth of the ring gear when the drive gear is engaged with the stop surface to prevent rotation of the third gear element. The drive gear may be rotated in a first direction to cause a transmission gear change toward or into a park gear and in a second direction to cause a transmission gear change away from or out of park gear. The second drive member may include a spring that rotates the third gear element when the retainer is moved to the second position. The retainer may be coupled to the drive gear and include a stop surface that when engaged by a stop, prevents rotation of the drive gear, and the retainer and drive gear are movable relative to the stop to permit rotation of the drive gear when the retainer is in the second position.

BRIEF DESCRIPTION OF THE DRAWINGS

The following detailed description of preferred implementations and best mode will be set forth with regard to the accompanying drawings, in which:

FIG. 6 is an enlarged perspective view of a portion of a housing and a second drive element in a first position;

FIG. 7 is an enlarged perspective view of a portion of a housing and the second drive element in a second position;

DETAILED DESCRIPTION OF PREFERRED EMBODIMENTS

Figure 1:
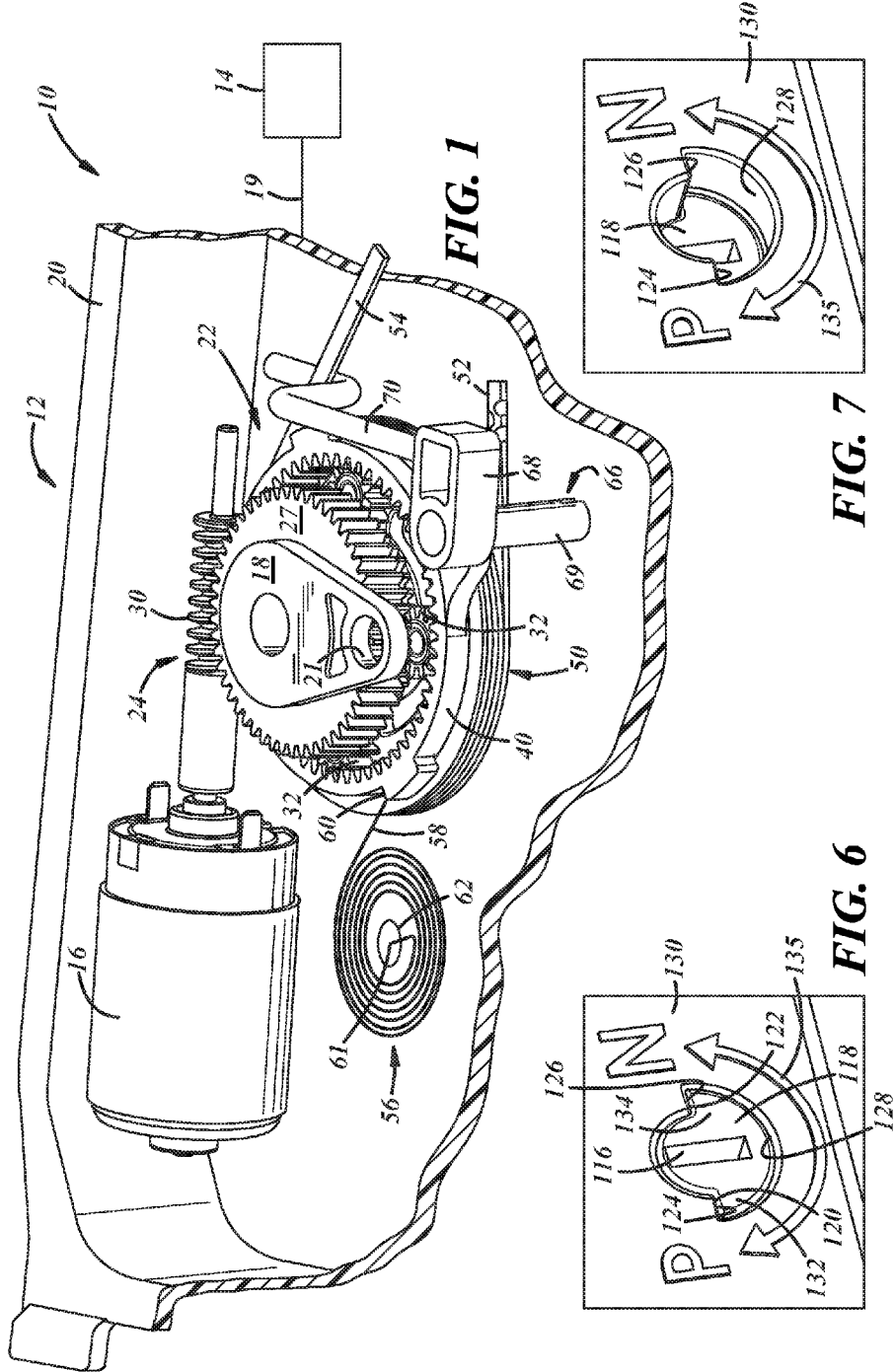
FIG. 1 is a perspective view of a shifting system actuator.

Referring in more detail to the drawings, FIG. 1 shows a transmission shifting system 10 including an actuator 12 that is controlled by an operator of a vehicle to command a gear shift of the transmission 14, for example to shift the transmission among and between park, neutral, reverse and forward drive gears. The shifting system 10 may be a so-called "shift by wire" system where an operator command for a gear shift is transmitted to an electric motor 16 of the actuator 12, and the motor 16 drives an output mechanism, such as an output shaft 18, of the actuator 12 that is coupled to a shift mechanism of the transmission 14 to shift among the transmission gears. The output mechanism may be any device or component that may couple, directly or indirectly, the actuator to a shift mechanism of the transmission. In the example shown, the output shaft 18 is coupled to a shift cable 19 that may be coupled to a shift mechanism on the transmission 14, as schematically shown in FIG. 1. The output 18 may include an opening 21 adapted to receive an end connector of one end of the cable 19 in known manner.

Should electric power be lost in the vehicle, or at least in an electrical circuit of the vehicle electric system that includes the motor 16, then the ability of the vehicle operator to control shifting of the vehicle transmission may also be lost. In this situation, it may be desirable to shift the transmission 14 into park so that any motion of the vehicle can be stopped and further motion prevented until the electric power is restored to the actuator motor 16. If the power is lost and the vehicle is in park, it may be desirable to permit the vehicle to be shifted out of park to, for example, facilitate moving or towing the vehicle.

Figure 2:
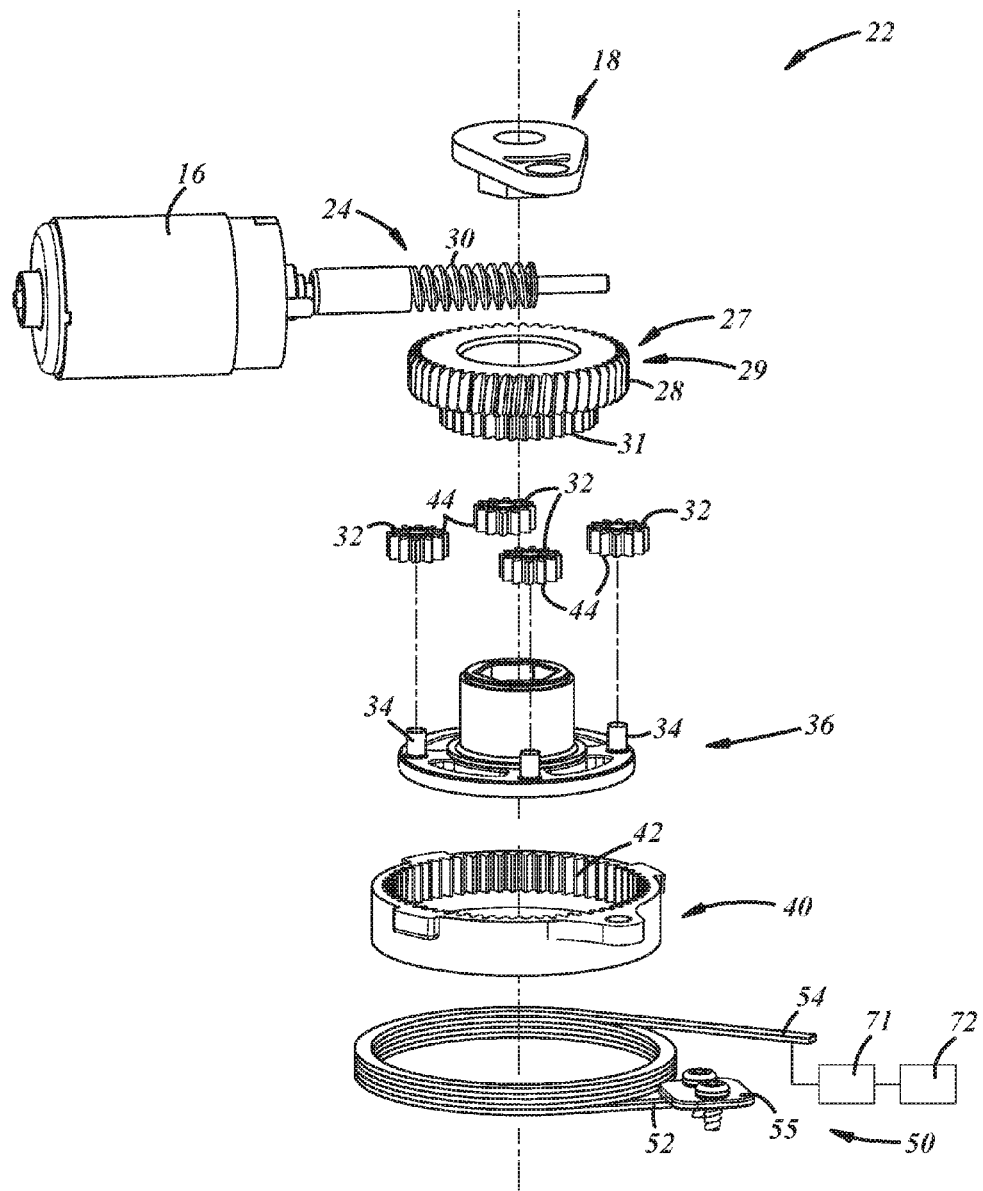
FIG. 2 is an exploded view of a portion of the actuator.
Figure 3:
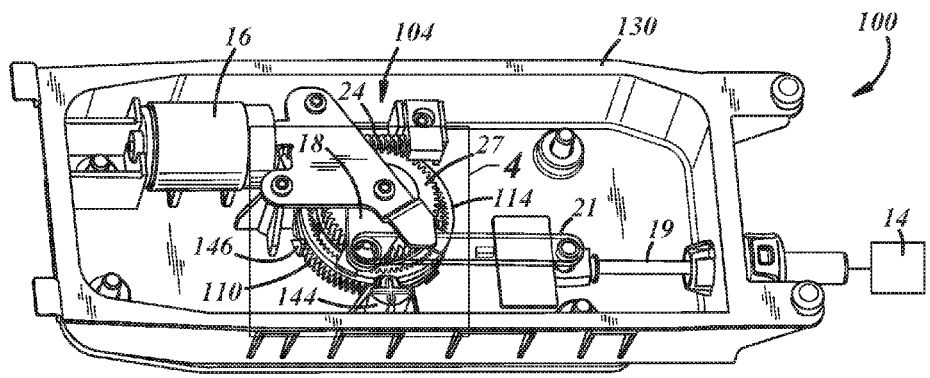
FIG. 3 is a perspective view of a shifting system actuator.
Figure 4:
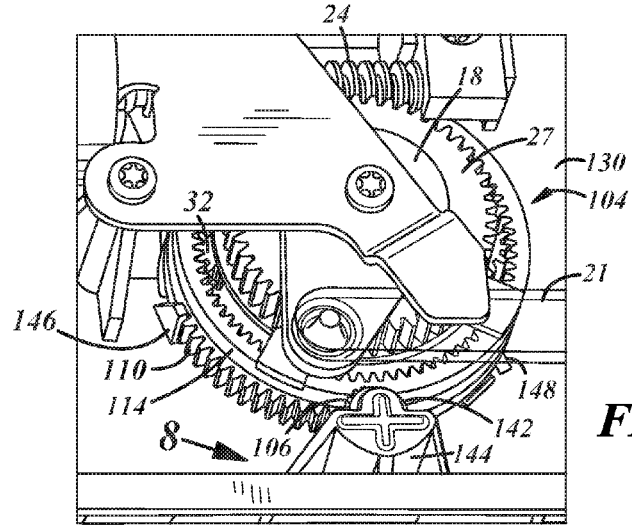
FIG. 4 is an enlarged perspective view of a portion of the actuator in FIG. 3.
Figure 5:
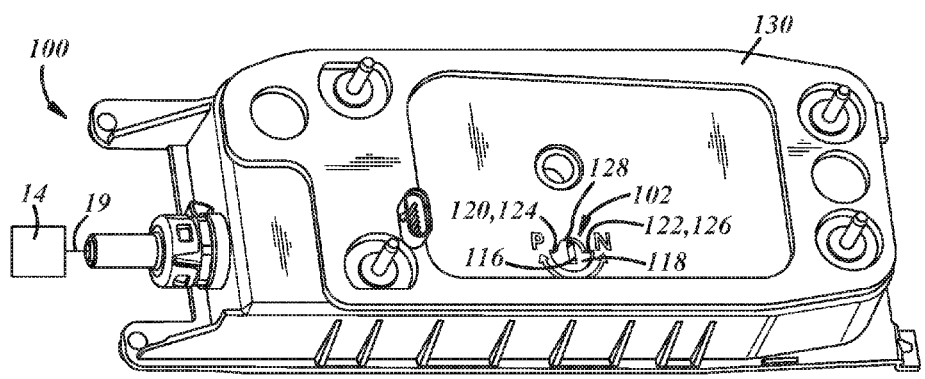
FIG. 5 is a bottom perspective view of the actuator of FIG. 3.

As shown in FIG. 1, the actuator 12 may include a housing 20 shown with a cover removed to expose internal components. The actuator 12 may also include a main drive element that, through a drivetrain 22, drives the output shaft 18 to shift the transmission 14. The main drive element may be any device capable of causing a shift of the transmission 14 in response to an operator of the vehicle's request. The drivetrain 22 may be any device or devices that interface with the main drive element and the transmission 14 to facilitate shifting the transmission. In at least one implementation, the main drive element includes the electric motor 16 and a drive gear 24, shown here as a worm that is rotated by the motor. The worm 24 in this implementation is meshed with a first input 27 of the drivetrain 22, which, in this implementation, is shown as a worm gear 27 having external teeth 28 that mesh with teeth 30 on the worm 24. Further, as shown in FIG. 2, the drivetrain 22 may include a planetary gear set and the first input includes a sun gear 29 that is coupled to the worm gear 27. Accordingly, rotation of the worm 24 causes rotation of the worm gear 27 and sun gear 29.

As shown in FIG. 2, the sun gear 29 includes teeth 31 adapted to be meshed with an output 32 of the drivetrain 22. In the implementation shown, the output 32 includes one or more planet gears meshed with the sun gear 29 so that rotation of the sun gear 29 causes rotation of the planet gears 32. The planet gears 32 are carried for rotation about shafts or pins 34 that are connected to a carrier 36. The carrier 36, in turn, is coupled to the output shaft 18 for co-rotation of the carrier 36 and output shaft 18. In this way, movement of the planet gears 32 around the sun gear 29 causes rotation of the output shaft 18. In the implementation shown four planet gears 32 are provided, although any desired number may be used.

The planet gears 32 are also meshed with a second input 40 of the drivetrain 22. The second input, in the implementation shown, includes a ring gear 40 having inwardly extending teeth 42 meshed with complementary teeth 44 of the planet gears 32 which are simultaneously engaged with the sun gear teeth 31. During a normal or first mode of operation of the actuator 12 in which the gears of the transmission 14 are shifted as commanded by an operator of the vehicle, the planet gears 32 move relative to the ring gear 40 about the inner circumference of the ring gear 40, and the ring gear is held so that it does not rotate. In at least one implementation, the ring gear 40 is held against rotation by a retainer 50.

The retainer 50 may be any device capable of inhibiting or preventing rotation of the ring gear 40, and it may be releasable to selectively permit rotation of the ring gear 40. In at least one implementation, the actuator's second mode of operation enables the transmission 14 to be shifted out of park when electric power to the motor 16 is lost or the motor is not otherwise working. During this second mode of operation, the retainer 50 is released so that the ring gear 40 can rotate, the sun gear 29 is held in place and the ring gear 40 is driven in the second direction. Rotation of the ring gear 40 causes a corresponding movement of the planet gears 32 and both the ring gear 40 and planet gears 32 rotate relative to the sun gear 29. This movement of the planet gears 32 causes rotation of the output shaft 18 and a corresponding movement of the shift mechanism 20 of the transmission 14 until the transmission is shifted out of park. The sun gear 29 may be held in place by the motor 16 which, while not operating, resists or prevents rotation of the worm 24 to which the sun gear 29 is coupled via the worm gear 27. Of course, a separate lock mechanism may be used to hold the sun gear 29 during the second mode of operation, if desired.

In the implementation shown in FIGS. 1 and 2, the retainer 50 is a torsion or clutch spring that is coiled around the exterior of the ring gear 40 and has one fixed leg 52 and one movable leg 54. The fixed leg 52 is attached to or otherwise held immobile by an adjacent structure, which could be the housing 20 or other portion of the actuator 12 or a structure not related to the actuator (a bracket 55 is shown in FIG. 2 for this purpose). The movable leg 54 may be moved relative to the fixed leg 52. In its normal state, without movement of the movable leg 54 relative to the fixed leg 52, the spring 50 provides a force that prevents or at least inhibits or limits rotation of the ring gear 40. However, when the movable leg 54 is moved away from the fixed leg 52, the force of the spring 50 on the ring gear 40 is relieved or at least sufficiently reduced to permit rotation of the ring gear 40.

Rotation of the ring gear 40 may be accomplished by a second drive element 56 which may be any device that can provide a suitable rotational force on the ring gear 40. As such, the second drive element is shown schematically in FIG. 1. One possible embodiment of a second drive element includes a spring which may be called herein a shift spring 56 because its function is to shift the transmission 14 when the ring gear 40 is able to rotate. While any suitable spring could be used, the shift spring 56 may be a torsion spring in the illustrated example. The shift spring 56 has a first end 58 bearing on the ring gear 40, such as at a shoulder 60 or retention slot or other feature of the ring gear 40 to bias the ring gear 40 for rotation in the second direction. A second end 61 of the shift spring bears on a bracket or post 62, which may be attached to another structure and held against rotation. Accordingly, when the force of the retainer 50 on the ring gear 40 is relieved, the shift spring 56 rotates the ring gear 40 which causes the output shaft 18 to rotate and shift the transmission 14 out of park.

As shown in FIG. 1, a release mechanism or third drive element 66 is provided to release the ring gear retainer 50 and permit rotation of the ring gear 40. As noted above, this may be desirable to permit the vehicle to be shifted out of park when the shift control assembly is not working, such as when electric power is not available to the motor 16 or when the motor is not working for some other reason. As also noted above, the illustrated embodiment of the retainer is a torsion spring 50 that is released by moving the movable leg 54 in a direction tending to unwind the spring 50. To move the movable leg 54, the third drive element 66 is provided which engages and moves the leg 54 as noted.

The third drive element 66, in at least one implementation, includes a release that may be manually displaced. The release 66 has a retracted position wherein the torsion spring 50 engages the ring gear 40 and prevents rotation of the ring gear 40. The release 66 also has an advanced position wherein the release causes movement of the movable leg 54 to release the retaining force on the ring gear 40 and permit the ring gear to rotate. As shown, the release 66 includes a pivoted lever 68, which may be carried by and pivot with post 69, and which may be manually pivoted to the advanced position. The lever 68 may itself engage the movable leg 54, or a link 70 may be provided, as shown, where the link 70 is coupled to the lever 68 and moves as the lever is moved. Upon movement of the release 66 to its advanced position, the retaining force on the ring gear 40 is released and the second drive element 56 may rotate the ring gear 40 to shift the transmission out of park. In at least some implementations, the transmission may be shifted into a neutral gear to facilitate, pushing or otherwise moving the vehicle, or towing the vehicle.

While described above as a manually movable lever 68, a motor 71 (FIG. 2) could also be provided to move the release 66 to its advanced position. The motor could be powered by electric power provided from a power storage device 72, such as a battery or one or more capacitors. The stored power may be provided to the motor by a controller in predefined circumstances, such as upon detection of a fault in the electric power to the motor 16, or a fault in operation of the motor 16, for example. When a motor is provided, the motor may directly move the movable leg 54, or a release, gear, cam or other intermediate component may be driven by the motor to move the movable leg, as desired.

A third mode of operation may be employed after the second mode of operation is complete and the vehicle transmission 14 has been shifted out of park. The third mode of operation resets the actuator 12 so that the normal or first mode of operation can again commence when electrical power is restored to the main motor 16. In more detail, during the recovery or third mode of operation, the ring gear 40 is rotated to cause the transmission to be returned to park. This returns the ring gear 40 to its proper position and winds the shift spring 56 so that the necessary force can again be provided for a subsequent shifting event, if electrical power to the main motor 16 is again lost.

To return the ring gear 40 to its starting position, the output shaft 18 is held immobile, the ring gear 40 is not locked and the main motor 16 is energized to rotate the sun gear 29. Rotation of the sun gear 29 causes a corresponding rotation of the planet gears 32 which in turn rotate the ring gear 40 back toward its starting position and thereby winds the shift spring 56. The output shaft 18 may be locked by any suitable mechanism during the third mode of operation, or its movement may be prevented or resisted by the transmission in park.

After the ring gear 40 is returned to its starting position, the release 66 or other mechanism can be retracted to permit the movable leg 54 to return to its retaining position to re-lock the ring gear 40 and prevent it from rotating. In this way, the actuator components (e.g. motors, drivetrain, output shaft, release mechanism, retainer and any locking mechanism) are positioned and arranged to permit future shifting of the transmission 14 in the first mode of operation, as commanded by a vehicle operator under the power of the main motor 16.

A second embodiment of a transmission shifting system 100 is shown in FIGS. 3-10. The shifting system 100 includes a second drive element 102 that is coupled to a drivetrain 104 to selectively cause the drivetrain 104 to shift the transmission 14. The drivetrain 104 (shown in FIG. 10) may be arranged in the same general manner of the drivetrain 22 with differences as noted below. Where the components are the same, the same reference numbers will be used for ease of description. In the implementation shown, the second drive element includes a drive gear 106 having teeth 108 meshed with teeth 110 extending from the periphery 112 of the ring gear 114. Rotation of the drive gear 106 rotates the ring gear 114. When the sun gear 29 is held against rotation, for example by the motor 16 and worm 24 engaged with the worm gear 27, rotation of the ring gear 114 causes a transmission shift. The sun gear 29 may be held against rotation, for example, when the motor 16 fails, or an electrical fault occurs in the system 100, as noted above.

During such a failure, it may be desirable to shift the transmission 14 into park, or to shift the transmission out of park. In at least some implementations, the drive gear 106 may be used to do both. Rotation of the drive gear 106 in a first direction rotates the ring gear 114 in a direction tending to shift the transmission 14 to park. Rotation of the drive gear 106 in a second direction rotates the ring gear 114 in a direction tending to shift the transmission 14 out of park. The drive gear 106 may be rotated manually, for example with a tool like a screwdriver or the like. To that end, the drive gear 106, or a component coupled to it, may include one or more drive features 116 engageable to facilitate rotation of the drive gear 106. Or the drive gear 106 may be driven to rotate by a motor, and as noted above, the motor may be powered by electrical power from a power supply or power storage device.

Figure 8:
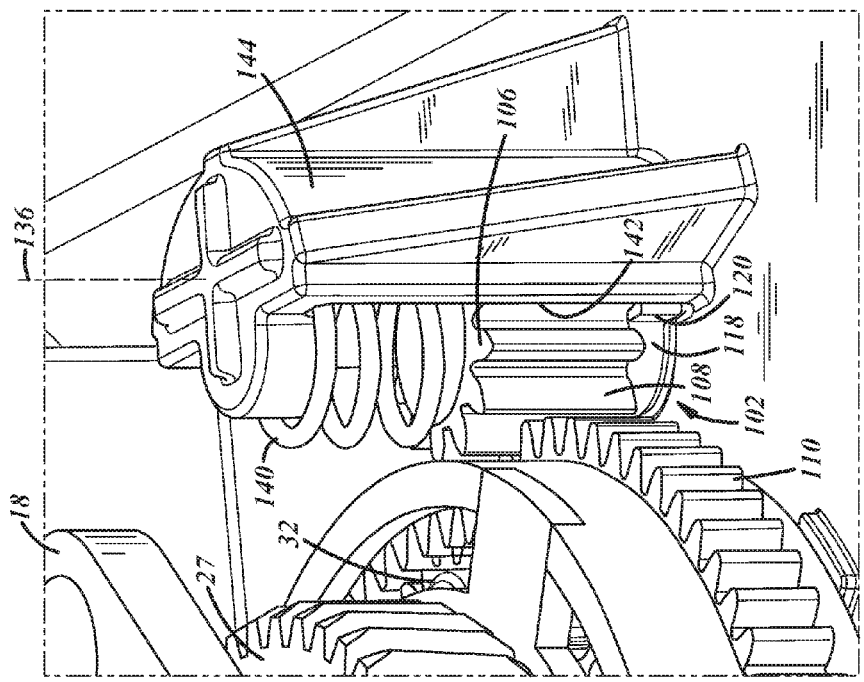
FIG. 8 is an enlarged, fragmentary perspective view showing the second drive element in the first position.
Figure 9:
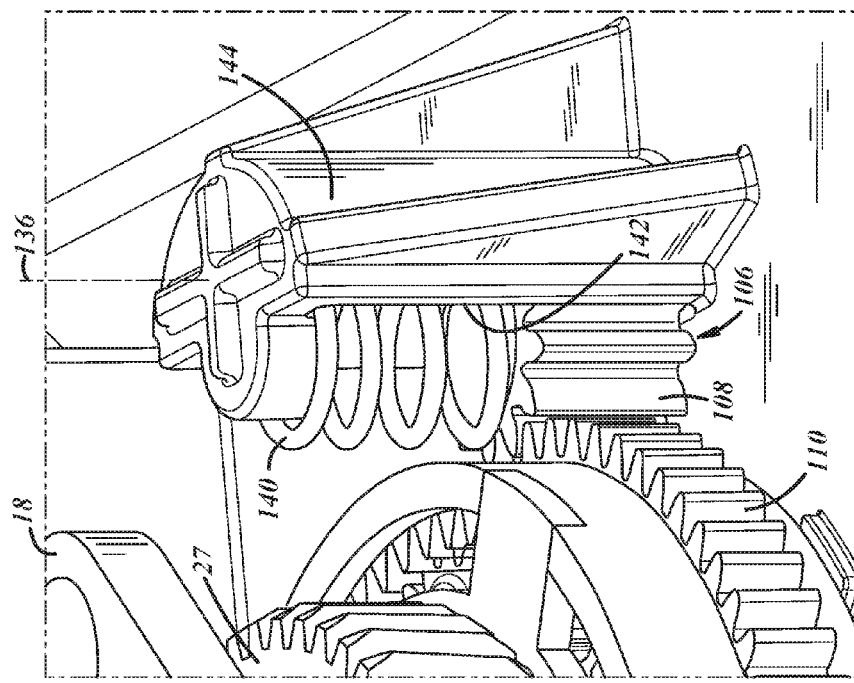
FIG. 9 is an enlarged, fragmentary perspective view showing the second drive element in the second position.
Figure 10:
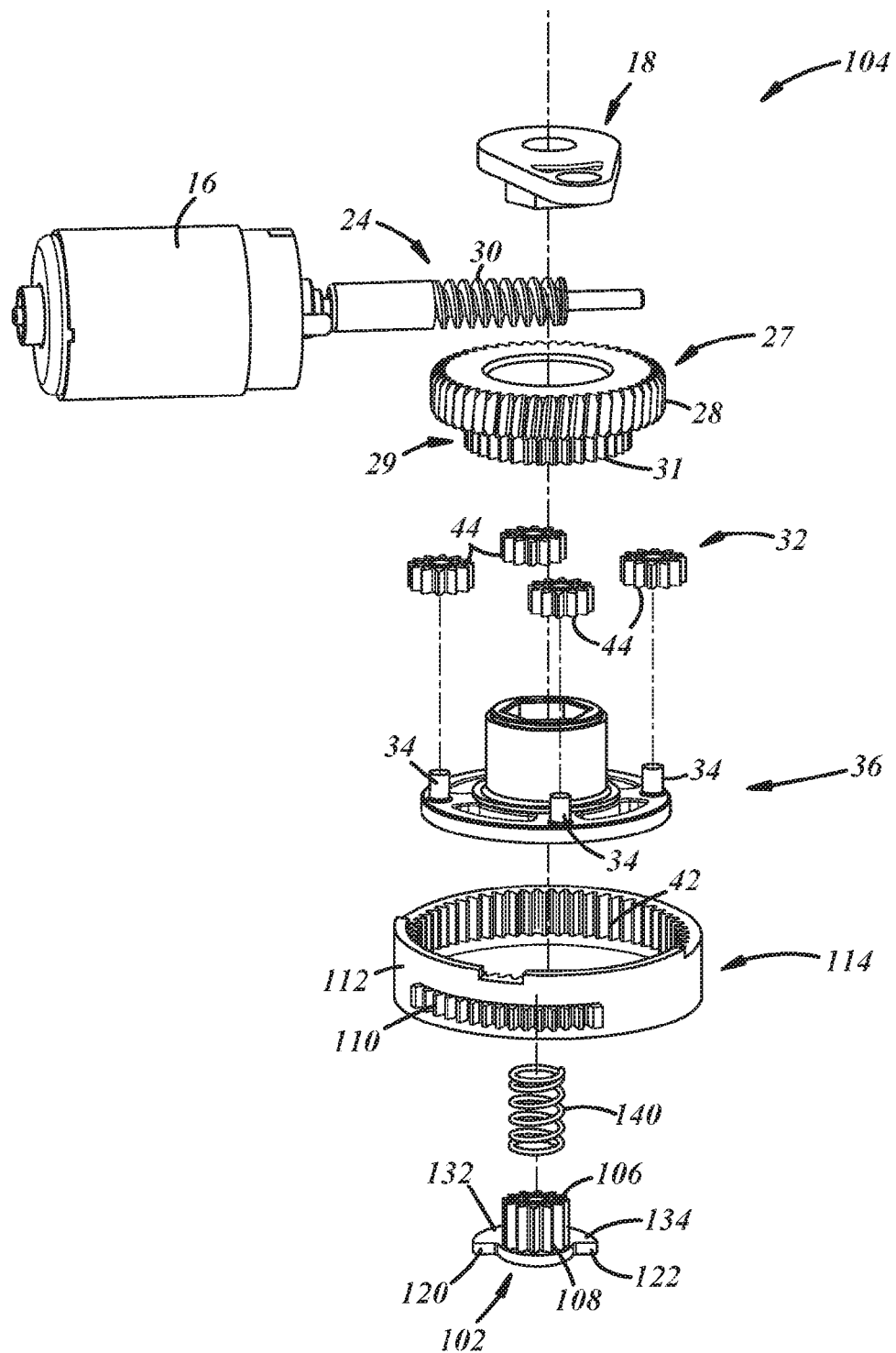
FIG. 10 is an exploded view of a portion of the actuator.

It may also be desirable to hold the transmission 14 in a desired gear after utilization of the drive gear 106 to rotate the ring gear 114 and cause a transmission shift, as noted above. Also, in normal operation of the system, the ring gear 114 is held against rotation and the sun gear 29 is driven by the motor 16. As shown in FIGS. 8 and 9, to hold a particular position of the ring gear 114, the drive gear teeth 108 may be continually meshed with the ring gear teeth 110, and the drive gear 106 may be held against rotation by a retainer 118 until such time that rotation of the drive gear 106 is desired. Thus, because the drive gear 106 cannot rotate, the ring gear 114 that is meshed with the drive gear 106 cannot rotate.

In one form, as shown in FIGS. 5-9, the retainer 118 is coupled to the drive gear 106 and includes stop surfaces 120, 122 selectively engageable with opposed stops 124, 126 to prevent rotation of the drive gear 106 in either direction when the stop surfaces 120, 122 and stops 124, 126 stops are engaged. As shown in FIGS. 6 and 7, stops 124, 126 are defined by axially and generally radially extending surfaces defined in a periphery of a cavity 128 in the housing 130 that contains the drivetrain 114. In the example shown, the drive gear 106 includes a head 118 which defines the retainer and includes the drive features 116 and stop surfaces 120, 122 formed in outwardly projecting flanges 132, 134. The head 118 may be shaped to be received within the cavity 128, and to move axially relative to the housing 130 and the ring gear 114 as shown by comparison of FIG. 6 with FIG. 7, and FIG. 8 with FIG. 9. In this way, the head 118 may be accessible from outside of the housing 130, if desired, and may be axially displaced into the housing 130 to clear the stops 124, 126 and permit rotation of the drive gear 106.

In more detail, in at least some implementations, such as shown in FIGS. 6-9, the drive gear 106 is movable axially (e.g. along its axis of rotation 136) relative to the ring gear 114 and the stops 124, 126. The axially extending drive gear teeth 108 remain engaged with the ring gear teeth 110 when the drive gear 106 is axially moved between the first and second positions, but the stop surfaces 120, 122 move into and out of registry with the stops 124, 126 as the drive gear 106 is axially moved. When the drive gear 106 is in a first position (FIGS. 6 and 8), the stop surfaces 120, 122 are axially aligned with the stops 124, 126 and rotation of the drive gear 106 in either direction is prevented by engagement of the stop surfaces with the stops. This also prevents rotation of the ring gear 114 in either direction. When the drive gear 106 is axially moved to a second position (FIGS. 7 and 9), the retainer 118 is moved into the housing 130 and the stop surfaces 120, 122 are no longer axially aligned with the stops 124, 126. In this position, the drive gear 106 may be rotated to rotate the ring gear 114 and cause a transmission shift. In the implementations shown, the drive gear is rotated manually such as with a tool engaging the drive feature 116 in the retainer 118. As shown by arrow 135, rotation of the retainer 118 and drive gear 106 in one direction will shift the transmission to park (shown by letter P in the drawings) and rotation in the opposite direction will shift the transmission to neutral (shown by letter N in the drawings).

After the drive gear 106 has been rotated to rotate the ring gear 114 and cause a desired transmission shift, the drive gear 106 may be axially returned to its first position (FIGS. 6 and 8) to prevent any additional, unintended rotation of the drive gear. A biasing member, such as a spring 140, may act on and yieldably bias the drive gear 106 toward its first position. Hence, in the absence of a force holding the drive gear 106 away from its first position, the drive gear will be displaced by the spring 140 to its first position wherein rotation of the drive gear is prevented. Thus, even if the head 118 is not aligned with and received within the cavity 128 after the drive gear rotation, such as if the flanges 132, 134 are not aligned with corresponding portions of the cavity 128, upon slight rotation of the ring gear 114 not sufficient to cause a gear change, the head 118 will become properly aligned with the cavity 128 and then the spring 140 will axially move the head 118 into the cavity 128 with the stop surfaces 120, 122 aligned with and abutting the stops 124, 126. The drive gear 106 and spring 140 may be received and retained within a pocket 142 defined in a wall 144 in the housing 130. The wall 144 may keep the drive gear meshed with the ring gear teeth 110 while permitting axial reciprocation of the gear 106.

While the stop surfaces 120, 122 are shown and described as being integrally formed in the same body as the drive gear 106 and its teeth 108, the stop surfaces could be provided in a separate component operably associated with the drive gear 106, such as a cap or other member that may be disposed adjacent to or over part of the drive gear to prevent rotation of the drive gear when installed. The component may be moved or removed to permit rotation of the drive gear 106 and then reinstalled after drive gear rotation has been completed. Such a component may mate with or be received against a portion of the housing 130, for example, to prevent rotation of the component or drive gear when installed. Further, in a system wherein a drive motor rotates the drive gear 106, the motor may hold the drive gear 106 against rotation, for example by use of a worm meshed with the drive gear.

For normal operation of the shift system 100 after a transmission shift via the drive gear 106, the drive gear 106 may be rotated back to its starting position to return the ring gear 114 to its starting or home position. Then, the head 118 may be received within the cavity 128 to prevent unintended rotation of the ring gear 114 in use of the shift system 100. The amount of rotation of the ring gear 114 that may be achieved via the drive gear 106 may be limited to control the positions of the ring gear 114 and thereby achieve a desired transmission shift or gear selection. In the example shown, opposed limit surfaces 146, 148 (FIG. 4) may be provided to engage the ring gear 114 and limit rotation of the ring gear which likewise limits rotation of the drive gear 106 that is meshed therewith. The limit surfaces 146, 148 may be circumferentially spaced apart to allow a desired range of rotation of the ring gear 114 between the limit surfaces. In the example shown 146, 148, the limit surfaces are carried by the housing 130 and are each arranged to engage an outside one of the teeth 110 of the ring gear 114 (e.g. the teeth at the ends of the gear sector formed in the periphery of the ring gear), although the ring gear 114 may include tabs or other features to engage the limit surfaces 146, 148.

Accordingly, a shift system 10, 100 as set forth herein may be arranged in various ways to permit desired shifting of a vehicle transmission 14 even if power is lost to the electric shifting/drive elements. The transmission 14 may be shifted into or out or park, as desired. Further, resetting of the system may occur automatically, or otherwise be done in similar manner to the transmission shifting, to facilitate normal use of the shifting system when power is restored in the system or the other fault in the system is fixed.

While the forms of the invention herein disclosed constitute presently preferred embodiments, many others are possible. It is not intended herein to mention all the possible equivalent forms or ramifications of the invention. For example, while the drivetrain 22 was shown and described as a planetary gear set, other arrangements are possible. Also, while the first input was described as being the sun gear 29, the second input the ring gear 40 and the output the planet gears 32, the gears could be arranged differently so that the different gears define different ones of the inputs and output. It is understood that the terms used herein are merely descriptive, rather than limiting, and that various changes may be made without departing from the spirit or scope of the invention.

The invention claimed is:

1. A gear shift control system, comprising:
a first drive member;
a drivetrain including a first input driven by the first drive member during a first mode of operation to cause a transmission gear shift, a second input driven during a second mode of operation to cause a transmission gear shift and an output coupled to and selectively driven by both the first input and the second input, the output adapted to be coupled to a shift mechanism of the transmission;
a second drive member coupled to the second input to drive the output through the second input during said second mode of operation to cause a transmission gear shift; and
a retainer selectively coupled to the second input and manually movable between a first position wherein the retainer prevents movement of the second input during the first mode of operation and a second position wherein the retainer permits movement of the second input during the second mode of operation.

2. The system of claim 1 wherein the second drive element includes a drive gear coupled to the second input and the retainer includes at least one stop surface engaged by a stop in the first position to prevent rotation of the drive gear and wherein the retainer stop surface may be disengaged from the stop in the second position to permit rotation of the drive gear.

3. The system of claim 2 wherein the drive gear may be manually rotated.

4. The system of claim 2 wherein the drive gear may be rotated in a first direction to cause a transmission gear change toward or into a park gear and in a second direction to cause a transmission gear change away from or out of park gear.

5. The system of claim 2 wherein the drive gear and second input include meshed teeth.

6. The system of claim 2 wherein the first input, second input and the output are gears in a planetary gear set with the first input being one of a sun gear and a ring gear and the second input being the other of the sun gear and ring gear, and the second input includes teeth that are meshed with teeth of the drive gear.

7. The system of claim 6 wherein the second input is the ring gear and the teeth of the ring gear are formed in a periphery of the ring gear.

8. The system of claim 1 which also comprises a release associated with the retainer and manually movable from a first position in which the retainer holds the second input against movement and a second position wherein the retainer does not hold the second input against movement.

9. The system of claim 2 which also comprises a housing in which the drivetrain is received and wherein the stop is defined by the housing.

10. The system of claim 2 wherein the retainer is yieldably biased toward the first position, and movable axially relative to the stop and the second input.

11. The system of claim 2 which also comprises a limit surface adapted to limit movement of the second input during the second mode of operation.

12. The system of claim 11 wherein the limit surface is positioned so that when the limit surface is engaged by the second input the transmission is in a desired gear.

13. The system of claim 12 wherein the desired gear is park.

14. The system of claim 12 wherein the desired gear is not park.

15. The system of claim 14 which also comprises a second limit surface wherein the second limit surface corresponds to a position of the second input wherein the transmission is in park.

16. The system of claim 1 wherein the first drive member is electrically operated and the second drive member is not electrically operated.

17. The system of claim 8 wherein the retainer includes a torsion spring having a movable leg and the release is manually movable to the second position wherein the movable leg is displaced.

18. The system of claim 17 wherein the second drive element includes a spring that biases the second input for movement and upon movement of the release to the second position the second drive element moves the second input.

19. A gear shift control system, comprising:
a first drive member including an electric motor;
an output adapted to be coupled to a vehicle transmission and to the first drive member to be driven for rotation by the first drive member;
a planetary gear set coupled to the first drive member and the output, and having three intermeshed gear elements including a ring gear, a sun gear and at least one planet gear, where a first gear element is coupled to the first drive member and is driven for rotation by the first drive member, and a second gear element is coupled to the output shaft for rotation with the output shaft;
a second drive member coupled to a third gear element to drive the output shaft through the third gear element, wherein during a first mode of operation the transmission is shifted between park and other gears by causing the first drive member to rotate the output through the second gear element and the first gear element when a transmission gear shift is desired, and during a second mode of operation, the transmission is shifted by the second drive member which drives the output through the third gear element and first gear element, and wherein the second drive member includes a drive gear with teeth and the third gear element includes teeth meshed with the drive gear teeth so that rotation of the drive gear causes rotation of the third gear element.

20. The system of claim 19 which also includes at least one stop surface with which the retainer is selectively engaged to prevent rotation of the drive gear, and wherein the drive gear teeth are engaged with teeth of the ring gear when the drive gear is engaged with the stop surface to prevent rotation of the third gear element.

21. The system of claim 19 wherein the drive gear may be rotated in a first direction to cause a transmission gear change toward or into a park gear and in a second direction to cause a transmission gear change away from or out of park gear.

22. The system of claim 19 wherein the second drive member includes a spring that rotates the third gear element when the retainer is moved to the second position.

23. The system of claim 19 wherein the retainer is coupled to the drive gear and includes a stop surface that when engaged by a stop, prevents rotation of the drive gear, and wherein the retainer and drive gear are movable relative to the stop to permit rotation of the drive gear when the retainer is in the second position.

24. The system of claim 23 wherein the drive gear is rotated about an axis and the retainer and drive gear move axially when the retainer is moved between the first and second positions.

* * * * *